Feb. 6, 1968   MUTSUO KUROSAKI   3,367,858
DROPPING MERCURY ELECTRODE WITH DISCHARGE CONTROL MEANS
Filed Jan. 11, 1965   2 Sheets-Sheet 1
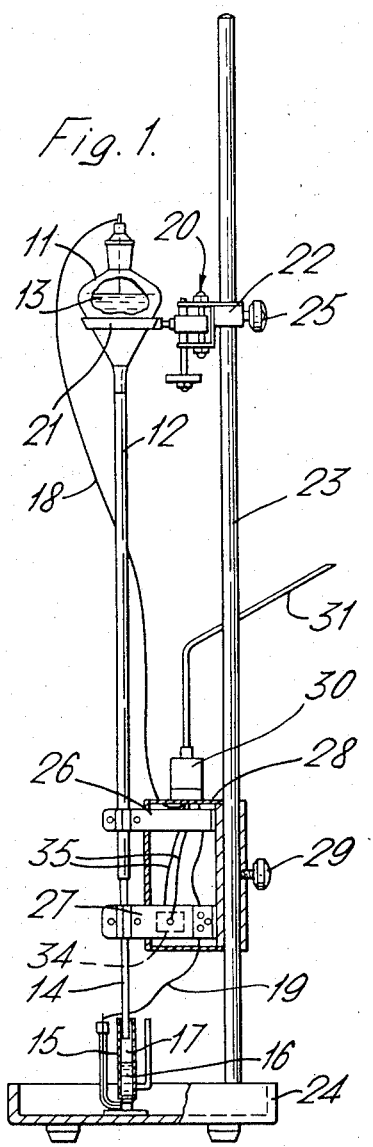
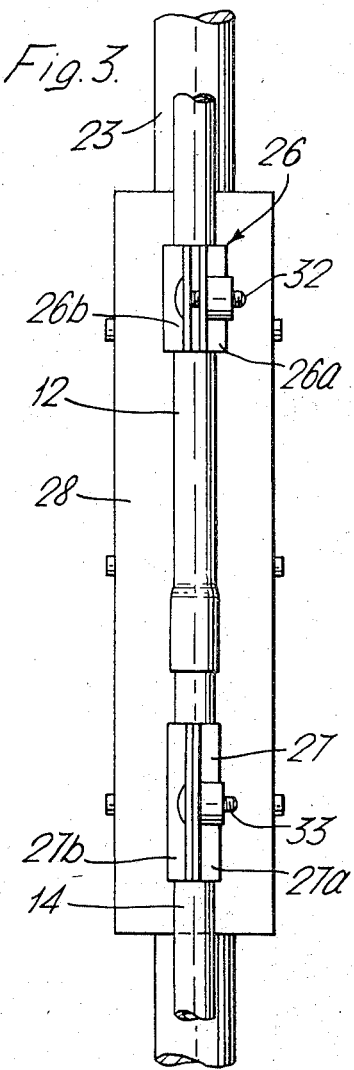
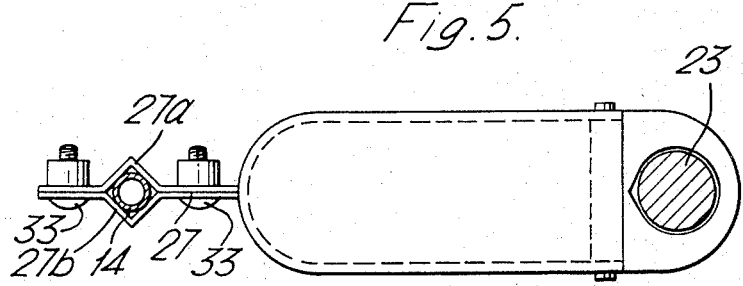

Feb. 6, 1968  MUTSUO KUROSAKI  3,367,858
DROPPING MERCURY ELECTRODE WITH DISCHARGE CONTROL MEANS
Filed Jan. 11, 1965  2 Sheets-Sheet 2

# United States Patent Office 3,367,858
Patented Feb. 6, 1968

3,367,858
DROPPING MERCURY ELECTRODE WITH
DISCHARGE CONTROL MEANS
Mutsuo Kurosaki, Kyoto, Japan, assignor to Yanagimoto
Seisakusho Co., Ltd., Kyoto, Japan
Filed Jan. 11, 1965, Ser. No. 424,793
6 Claims. (Cl. 204—195)

This invention relates to improvements in dropping mercury electrodes for use in polarography, and particularly to a device for forced dislodgment of droplets from the dropping mercury electrode.

The electrochemical method in the field of polarographic analysis is based on the fact that electrolysis of a solution between a polarizable electrode and a non-polarizable electrode produces current-voltage relationships that are typical for the quantity and quality of the investigated test species in the solution. The aqueous solution to be analyzed is placed in a glass cell containing two electrodes. One electrode consists of a glass capillary tube (internal diameter about 0.05 mm. or 0.002 in.) from which mercury slowly flows in drops (dropping mercury electrode), and the other is a pool of mercury. The cell is connected in series with a galvanometer for measuring the flow of current, in an electrical circuit which contains a battery, or other source of direct current, and a rheostat by means of which the voltage applied to the electrodes can be varied from zero up to about two volts. Usually with the dropping mercury electrode connected to the negative side of the polarizing voltage, the voltage is increased by small increments and the corresponding current is observed on the galvanometer. The current is very small until the applied voltage is increased to a value large enough to cause the substance being determined to be reduced at the dropping mercury electrode. The current increases rapidly at first as the applied voltage is increased above this critical value, but gradually attains a limiting value and remains more or less constant as the voltage is increased further. The critical voltage required to cause the rapid increase in current is characteristic of, and serves to identify, the substance being reduced (qualitative analysis). Under proper conditions the constant limiting current is governed by the rate of diffusion of the reducible substance up to the surface of the mercury drops, and its magnitude is a measure of the concentration of the reducible substance (quantitative analysis). Limiting currents also result from the oxidation of certain oxidizable substances when the dropping electrode is the anode.

In such a polarographc analysis as mentioned above, the recurring time intervals of successive drops are varied according to various factors such as any changes in the applied voltage and properties of the electrolyte to be used. If polarography is applied to a single sweep type oscillographic polarograph, it would be necessary to detect the moment of the dropping of each mercury droplet so that the sweeping operation may be synchronized therewith. On the other hand, in rapid polarography, it is necessary to forcedly dislodge mercury droplets from the capillary into the test solution. Some attempts have been made to substitute better means for the dropping mercury electrode, such as forced dislodgment of droplets from the capillary in rapid succession, synchronization of mercury droplets being discharged from the capillary, oscilloscopic sweeps over successive drops at definite recurring time intervals, etc. One of conventional methods for these purposes is to produce a mechanical impact on the capillary by means of electromagnetically produced force to thereby vibrate the capillary so that a mercury droplet may be forcedly dislodged from the capillary. This conventional device for forced dislodgment is disadvantageous because of rather complicated construction, poor durability and undesirable inertia in the vibration system. In addition it would be difficult to carry out the dropping with a good reproducibility of the droplets with regard to their drop time and mass of mercury per drop.

The principal object of the invention is to provide novel and useful means for forced dislodgment of mercury droplets from the capillary in an improved manner entirely different from any of conventional ones.

Another object of the invention is to provide means for forced dislodgment of mercury droplets from the capillary with a good reproducibility of the droplets with regard to their drop time and mass of mercury per drop.

A further object of the invention is to provide means for forced dislodgment of mercury droplets from the capillary in rapid succession.

A still further object of the invention is to provide means for forced dislodgment of mercury droplets from capillary with synchronous oscilloscopic sweeps over successive drops at definite recurring time intervals.

One of the other objects of the invention is to provide means for forced dislodgment of mercury droplets from the capillary, which is durable in construction and economically manufactured.

According to the invention, forced dislodgment of the mercury droplets from the capillary is carried out through the utilization of piezoelectric or electrostrictive effects.

Piezoelectricity is the electricity or electric polarity which results from the application of mechanical stress to certain dielectric crystals. Conversely, a proportional change occurs in the shape of the crystal when voltage is applied thereto. The phenomenon occurs only in matter of electrically polar nature, especially in single crystals of polar symmetry. Solid matter consists of electrically charged particles disposed in space, the positive and negative charges being in exact balance in an electrically unchanged body. The development of electric surface changes by mechanical deformation is therefore not unexpected. Considerations of symmetry, however, severely limit the conditions under which such charges can appear. The state of mechanical stress or resulting geometric deformation (strain) at any point in a solid is described by a stensor, which does not distinguish between opposite directions, whereas electric polarization and electric field are described by vectors which specify the sense of direction. If a mechanical stress is to produce an electric polarization, a directional quality must therefore be inherent in the body. Conversely, in an isotropic material, i.e., a body without inherent directional quality, mechanical stress or strain caused by an electric field must be equal for opposite directions of the field; this implies a quadratic dependence on the field. This quadric effect, known as electrostriction, is substantial only in materials of very high dielectric constant, notably ferroelectric materials. Among the electrostrictive materials there are barium titanate ceramic, lead titanate, lead zirconate, lead titanate zirconate and lead strontium titanate zirconate.

According to the invention, an electrostrictive element made of such a material having a very high dielectric constant as mentioned above is attached to a support member for the capillary from which mercury droplets are discharged. In this manner, a mercury droplet is forcedly dislodged from the end opening of the capillary each time when impulse voltage is applied to the electrostrictive element.

In a preferred embodiment of the invention, the electrostrictive element is a plate made of barium titanate ceramic, but any other electrostrictive elements may be utilized in carrying out to invention. The electrostrictive element may be kept in a biased condition with a certain definite voltage during the non-operative intervals while another impulse voltage of the opposite polarity may be applied at the operative moment which recurs at definite time intervals.

The vibration which is produced by the electrostrictive element is so quick and so small in amplitide that the recurring time intervals for discharging mercury droplets from the capillary may be shortened to a great degree. This also insures that a good reproducibility of the droplets is obtained with regard to their drop time and mass of mercury per drop. In addition, the device according to the invention is advantageous in its simple and durable construction with no frictional members which will result in a short life of the device.

Other objects and advantages of the invention will become apparent from the detailed description which follows when taken in conjunction with the accompanying drawings in which:

FIG. 1 is a schematic elevation, partly cut off, of the polarographic apparatus with the device for forced dislodgment of mercury droplets according to the invention;

FIG. 3 is a side elevation of FIG. 2;

FIG. 5 is a bottom view along the line 5—5 of FIG. 2.

Figure 2:
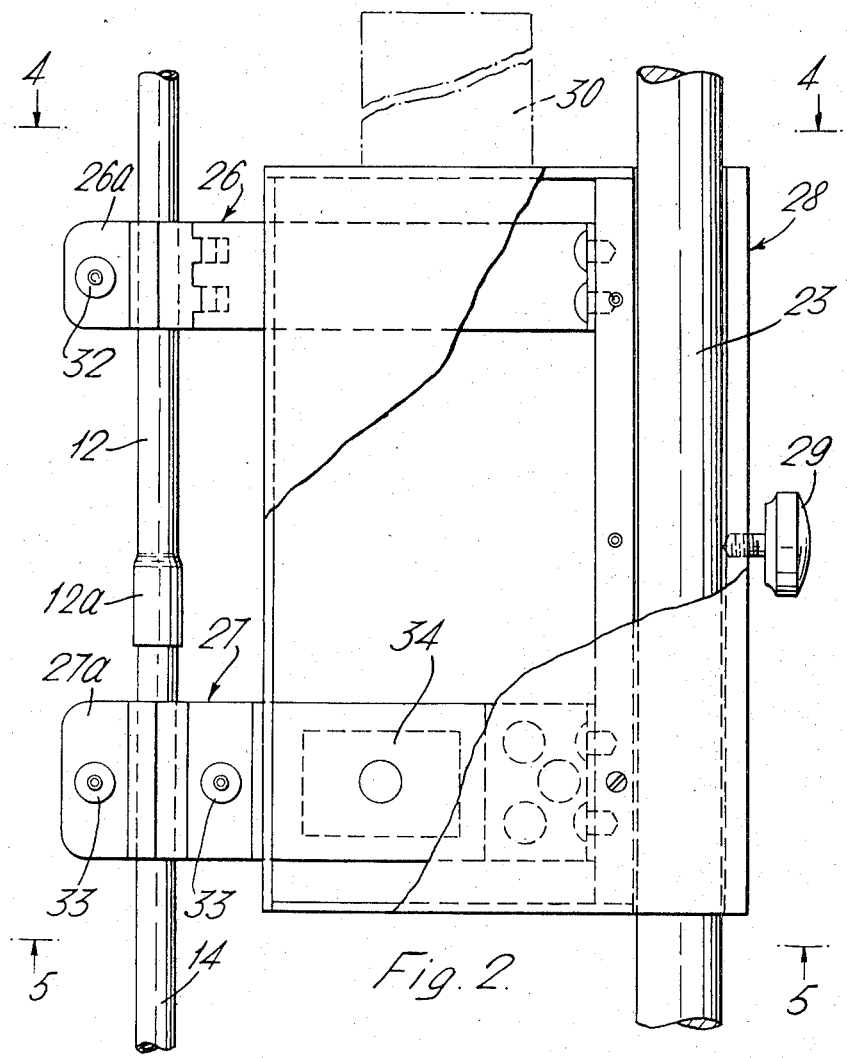
FIG. 2 is a front view on an enlarged scale of the device for forced dislodgment of mercury droplets illustrated in FIG. 1.
Figure 4:
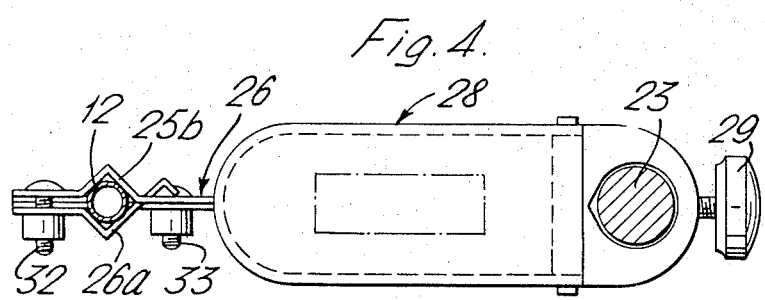
FIG. 4 is a plan view taken along the line 4—4 of FIG. 2.

Referring now to the drawings and first to FIG. 1, there is shown a polarographic apparatus including a mercury reservoir 11 having a flexible and elastic tube 12 leading off from the bottom of the reservoir 11. The mercury reservoir 11 may be made from glass or synthetic resin or other suitable material, and contains a supply of mercury 13. The flexible and elastic tube 12 may be made from elastic material such as rubber or or vinyl resin and is connected at its lower end to a short length of glass fine bore capillary tubing 14. The capillary tubing 14 preferably has a length of about 200 mm., an outside diameter of approximately 7 mm., a bore of the order of 20 to 100 microns diameter and a weight of about 15 g. The capillary tubing 14 extends into an open container or beaker 15, and its lower end is entirely surrounded by said container 15. A layer or pool of mercury 16 is in the bottom of container 15, being a conventional non-polarizable mercury pool electrode. It would be understood that other types of non-polarizable electrodes well known in the art may be employed instead. The distance between the mercury level in the reservoir 11 and the lower end of the capillary 14 may be of the order of 700 to 800 mm. Test solution is poured on top of the mercury pool 16 and fills the container 15 to a level somewhat above the lower end of the capillary 14. Mercury in the reservoir 11 and mercury in the container 15 are connected by means of electrical conductors 18, 19 to a source of electricity and other apparatus adapted for registering polarographic data, in the manner well known to those skilled in the art.

The mercury reservoir 11 is supported by a holder generally indicated as 20 which may comprise a ring-shaped support arm 21 on which the reservoir 11 is seated and a support frame 22 holding said support arm 21. The support arm 21 is minutely movable in the vertical direction so that it may be adjusted at a desired position with respect to the support frame 22. The support frame 22 is secured to a pole 23 vertically upstanding from the bottom or base member 24 on which the container 15 is deposited. The holder 20 may be fixed by a set screw 25 at any desired position on the pole 23. In this manner the potential energy of mercury in the reservoir 11 may be controlled.

The lower end portion of the elastic tube 12 and the capillary 14 are supported by the respective support arms 26 and 27 which both are carried by a single frame 28 which is in turn secured to the pole 23 adjustably at any position on the pole 23. 29 is a set screw for fixing the frame 28 at a desired position on the pole 23. At the top of the frame 28 is mounted a connector 30 for conductors 18, 19 to a connector cord 31 which is in turn connected to a power supply or conventional apparatus for registering polarographic data.

The support arm 26 for the flexible tube 12 is substantially stationary and may be provided at its free end with a pair of laterally extending closeable jaw members 26a and 26b between which the flexible tube 12 is held at a position immediately above the connecting end 12a, so that the mercury reservoir 11 and the major length of flexible tube 12 may be protected from vibration which occurs on the capillary 14. 32 is a screw for clamping the jaw members 26a and 26b to each other to firmly hold the flexible tube 12.

The support arm 27 for the capillary 14 may also be provided at its free end with a pair of laterally extending closable jaw members 27a and 27b between which the capillary 14 is firmly held. 33 indicates screws for clamping the closable jaw members 27a and 27b to each other. The support arm 27 serves as a vibrator. For this purpose the support arm 27 is made of a rigid and vibration transmitting material such as an iron plate. According to the invention, an electrostrictive element is attached to the support arm 27. By way of example, a rectangular plate 34 made of barium titanate ceramic and having dimensions of 20 x 30 x 0.31 mm.³ is mounted on the support arm 27 with use of a high strength quick bonding agent such as alpha cyanoacrylate adhesive. The mounting may be carried out by welding. The opposite junctions of the element 34 are connected by means of electric conductors 35 through a voltage control means to a D.C. electric source. Preferably, the element is mounted on the support arm 27 in such a manner that vibration transmitted to the capillary 14 is oriented in a direction transverse to the length of the capillary, but it should be noted that vibration in any other directions may also be utilized in carrying out the invention.

The voltage applied to the electrostrictive element is controlled, by way of example, in such a manner that the element is kept in a biased condition with a certain definite level, for example, +200 v. during its non-operative intervals while at the operative moment, it is subjected to an impulse voltage which may be of the opposite polarity to said biased voltage, for example, of —200 v. A moment of 0.01 second for applying an impulse voltage would be enough to dislodge a droplet from the capillary. Definite recurring time intervals would be selected within the range from 0.1 to 10.0 second, in case of oscillographic polarograph, preferably, fixed to five second intervals. In these specified cases, it has been found that the capillary is vibrated with an amplitude of about 1.0 mm. with the result of each droplet being discharged with a good reproducibility. Each droplet would have a definite weight within the range from 1 mg. to 5 mg.

What I claim is:

1. A dropping mercury electrode assembly comprising a capillary tube from which mercury droplets are discharged, means for supporting the capillary tube, and an electrostrictive element attached to said means for controlling the discharge of the mercury droplets, said electrostrictive element being operated by impulse voltage at definite time intervals.

2. The electrode assembly defined in claim 1, wherein said electrostrictive element is a plate made of barium titanate.

3. The electrode assembly defined in claim 2, wherein said electrostrictive element is kept in a biased condition with a certain constant voltage during the non-operative intervals while another impulse voltage of the opposite polarity is applied to said electrostrictive element at the operative moment which recurs at definite time intervals.

4. In a dropping mercury electrode assembly for use in polarography, including a mercury reservoir, a length of fine bore capillary and a flexible connecting tube leading off from said mercury reservoir and being connected to said capillary, means for forced dislodgment of mercury droplets from said capillary, said means comprising a support for said capillary and an electrostrictive element attached to said support, said electrostrictive element being operated by impulse voltage at definite time intervals.

5. The electrode assembly defined in claim 4, in which said flexible connecting tube is supported at a position immediately above its connecting end to said capillary.

6. The electrode assembly defined in claim 4, wherein said electrostrictive element is mounted on said capillary support in such a manner that forced vibration may be given to said capillary in a direction transverse of the length of said capillary each time when an impulse voltage is applied to said element.

References Cited

"Analyst," volume 75 (1950), pages 287–304.

HOWARD S. WILLIAMS, *Primary Examiner.*
T. TUNG, *Assistant Examiner.*